(12) United States Patent
Afana

(10) Patent No.: US 11,120,421 B2
(45) Date of Patent: Sep. 14, 2021

(54) MOBILE PAYMENT STATION SYSTEM AND METHOD

(71) Applicant: MOBILE EQUITY CORP., Solana Beach, CA (US)

(72) Inventor: Marwan Monir Afana, Allen, TX (US)

(73) Assignee: MOBILE EQUITY CORP., Solana Beach, CA (US)

( * ) Notice: Subject to any disclaimer, the term of this patent is extended or adjusted under 35 U.S.C. 154(b) by 0 days.

(21) Appl. No.: 16/711,408

(22) Filed: Dec. 11, 2019

(65) Prior Publication Data

US 2020/0387885 A1   Dec. 10, 2020

Related U.S. Application Data

(63) Continuation of application No. 14/082,425, filed on Nov. 18, 2013, now Pat. No. 10,535,058, which is a continuation of application No. 12/906,989, filed on Oct. 18, 2010, now Pat. No. 8,589,236.

(60) Provisional application No. 61/279,322, filed on Oct. 19, 2009.

(51) Int. Cl.
| | |
|---|---|
| *G06Q 20/20* | (2012.01) |
| *G06Q 20/32* | (2012.01) |
| *G06Q 20/40* | (2012.01) |
| *G06Q 30/00* | (2012.01) |
| *G06Q 40/00* | (2012.01) |

(52) U.S. Cl.
CPC ......... *G06Q 20/3223* (2013.01); *G06Q 20/20* (2013.01); *G06Q 20/40* (2013.01); *G06Q 30/00* (2013.01); *G06Q 40/00* (2013.01)

(58) Field of Classification Search
CPC .... G06Q 20/3223; G06Q 20/20; G06Q 20/40; G06Q 30/00; G06Q 40/00
USPC .......................................................... 705/16
See application file for complete search history.

(56) References Cited

U.S. PATENT DOCUMENTS

| | | | |
|---|---|---|---|
| 8,032,414 B2 * | 10/2011 | Payne ................ | G06Q 30/0238 705/14.53 |
| 8,127,999 B2 * | 3/2012 | Diamond ............... | G06Q 20/28 235/492 |

* cited by examiner

*Primary Examiner* — Garcia Ade
(74) *Attorney, Agent, or Firm* — Fenwick & West LLP

(57) ABSTRACT

A mobile device is used to initiate and execute a transaction between a customer and a merchant. A mobile device is used to initiate a point of sale transaction, wherein a merchant ID is sent to a payment processing server. Responsive to receiving a communication from the mobile device, the payment processing server requests transaction information from the merchant, wherein the merchant is identified based on the provided merchant ID. The merchant can provide transaction information such as the total sale amount to the payment processing server. The payment processing server can authenticate the customer and initiate a purchase transaction with the appropriate financial institutions associated with the customer and the merchant. The payment processing server can send a confirmation of the executed transaction to the merchant and the mobile device.

20 Claims, 11 Drawing Sheets

MOBILE PAYMENT STATION SYSTEM AND METHOD

RELATED APPLICATIONS

This application is a continuation application of U.S. application Ser. No. 14/082,425 filed on Nov. 18, 2019 which is a continuation application of U.S. application Ser. No. 12/906,989 filed on Oct. 18, 2010, now U.S. Pat. No. 8,589,236 and claims priority from U.S. provisional application No. 61/279,322 filed on Oct. 19, 2009, each of which is incorporated by reference herein in its entirety.

FIELD OF THE INVENTION

This invention generally relates to the field of electronic commerce and more particularly to using mobile communication devices to execute a commercial transaction.

BACKGROUND OF THE INVENTION

Using a credit card, debit card, payroll card, senior benefit card, ATM card or any stored value card (hereafter credit card) and a point of sale terminal to purchase one or more items from a merchant has become commonplace. For example, in order to initiate a point of sale, a merchant can enter the total sale amount in a terminal. The merchant can receive a credit card from the customer to process the sale. Once the customer's credit card information is entered in a point of sale terminal, the information is sent to servers associated with a clearing house. The clearinghouse can authenticate the credit information and route the transaction based on the routing numbers associated with the credit card. The clearing house can execute a transaction with an appropriate financial institution and provide a confirmation of the executed transaction to the merchant's point of sale terminal. The merchant can print a confirmation of the executed transaction to receive a customer's approval.

Such a method of executing a transaction is beneficial because it is quick and reliable. Additionally, the customer can execute a purchase at any time regardless of whether the customer has cash on hand to purchase a product. However, such a method of executing transactions requires that the customer have a credit card. A customer can use the convenience of a card to execute transactions through a debit card if the customer has an associated debit account. However, many customers do not have bank accounts, and therefore do not have debit cards. Similarly, some customers, such as kids under a certain age may not have access to or qualify for a credit card but nevertheless may need a secure method of executing a transaction for purchase of goods.

Additionally, a customer using a credit card runs the risk of credit card fraud or fraudulent transactions. For example, if a customer's credit card is lost or stolen, another person who is not the owner of the card can execute a transaction with the card by simply presenting the card to a merchant. Since the merchant initiates the point of sale for each transaction, the clearing house and the financial institutions may not catch a fraudulent transaction unless reported by the owner of the credit card.

A customer may also not be able to use credit processing systems to execute a purchase if the customer does not have his or her card available at the merchant site. For example, a customer cannot borrow someone else's credit card to execute a transaction associated with his or her own account. Thus, credit cards or cards associated with financial institutions provide a less than optimal method for executing a transaction associated with a customer's credit or financial account.

A customer may also not be able to use credit processing systems to execute a purchase if the customer's card has a defective magnetic strip, chip or the electronic near field communication (NFC) apparatus on the card is defective. Additionally, a customer may be unable to use credit processing systems to execute a purchase if the point of sale terminal at the store is defective or has a defective NFC receiver that prevents it from reading card information.

SUMMARY OF THE INVENTION

It is a general object of the present invention to allow a customer to use a mobile communications device to initiate and execute a transaction by reversing the conventional direction of point of sale transaction initiation; that is the processing server opens communications towards point of sale terminal utilizing merchant ID or point of sale terminal ID, instead of the conventional method of point of sale terminal opening communications towards processing server.

It is a general object of the present invention to allow a customer to use a mobile communications device to initiate and execute a transaction, which overcomes the aforementioned problems with using a credit or debit card by taking advantage of the prevalence of mobile communications devices and the communications abilities of mobile devices.

It is also a general object of the present invention to allow a customer to use other methods such as calling an interactive voice response (IVR) system and using voice or dual-tone multi-frequency (DTMF) commands on a landline to initiate and execute a transaction, which overcomes the aforementioned problems with using a credit or debit card by taking advantage of the prevalence of telecommunication methods available today.

A mobile device can be used to initiate and execute a transaction with a merchant. A mobile device is used to initiate a point of sale transaction, wherein a merchant ID or, for example, a point of sale terminal ID (hereafter called "merchant ID") is sent to a payment processing server. Responsive to receiving a communication from the mobile device, the payment processing server requests transaction information from the merchant, wherein the merchant is identified based on the provided merchant ID. The merchant can provide transaction information such as the total sale amount to the payment processing server. The payment processing server can authenticate the customer and initiate a purchase transaction with the appropriate financial institutions associated with the customer and the merchant. The payment processing server can send a confirmation of the executed transaction to the merchant and the mobile device.

It is another general object of the present invention to use a point of sale terminal associated with a merchant to execute a transaction between a merchant and a customer. A merchant can provide point of sale information including the purchase amount, merchant ID and an account phone number associated with the customer. An account phone number can include a financial institution account number that belong to the customer, a phone number that is associated with a financial account number that belongs to the customer, a phone number that is used as an account number in a financial institution hereafter referred to as "account phone number.". Responsive to receiving point of sale information from the merchant, a payment processing server identifies an account associated with the account phone number and sends an authorization request to the account phone number. The customer can enter authorization personal identification information on a communications device and send it to the payment processing server. The payment processing server can authenticate the customer and initiate a purchase transaction with the appropriate financial institutions associated with the customer and the merchant. The payment processing server can send a confirmation of the executed transaction to the merchant and the mobile device.

It is another general object of the present invention to use a payroll account associated with an account phone number to execute a transaction between a merchant and a customer. The point of sale transaction can be initiated by the merchant using the point of sale terminal or by a customer using a communications device or via an IVR call. A service data point (SDP) receives a merchant ID associated with the merchant and the account phone number associated with the customer and the payroll account. The payment processing server sends an authorization request to the account phone number. The customer can enter an authorization personal identification number on a mobile device associated with the account phone number and send it to the SDP. The SDP can authenticate the customer associated with the payroll account and initiate the purchase transaction between the merchant and the payroll account associated with the customer. The SDP can send a confirmation of the executed transaction to the merchant and the mobile device. The functionality of an SDP can be integrated in the mobile enablement center 106 and can be called either SDP or Mobile enablement center and vice versa. Similarly, the mobile enablement functionality center's functionality can be integrated in an SDP and be called the mobile enablement center or the SDP. For instance an implementation described below using an SDP can be carried out in a mobile enablement center and vice versa.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

Figure 1:
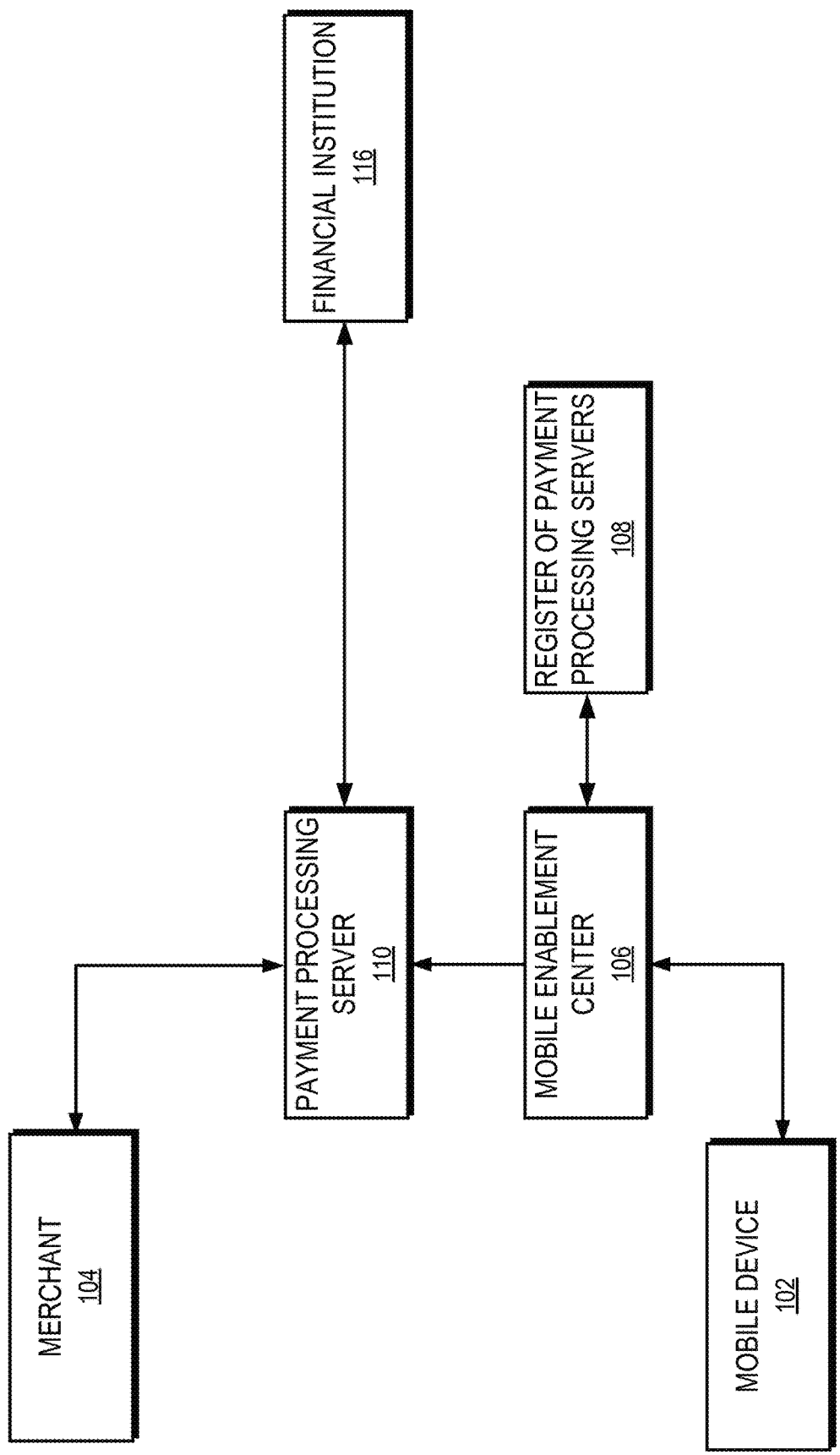
FIG. 1 is a high-level block diagram that illustrates a computing environment for using a mobile device to initiate a transaction according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE INVENTION

A preferred embodiment of the present invention is now described with reference to the figures where like reference numbers indicate identical or functionally similar elements. Also in the figures, the left most digit(s) of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" or "an embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic, electromagnetic, radio or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems. The invention can also be in a computer program product which can be executed on a computing system.

The present invention also relates to an apparatus for performing the operations herein. This apparatus may be specially constructed for the purposes, e.g., a specific computer, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

FIG. 1 is a high-level block diagram that illustrates a computing environment for using a mobile device to initiate a transaction according to one embodiment. The computing environment may include a mobile device 102, a mobile enablement center 106, a register of payment processing servers 108, a payment processing server 110, a merchant 104 and a financial institution 116.

Figure 2:
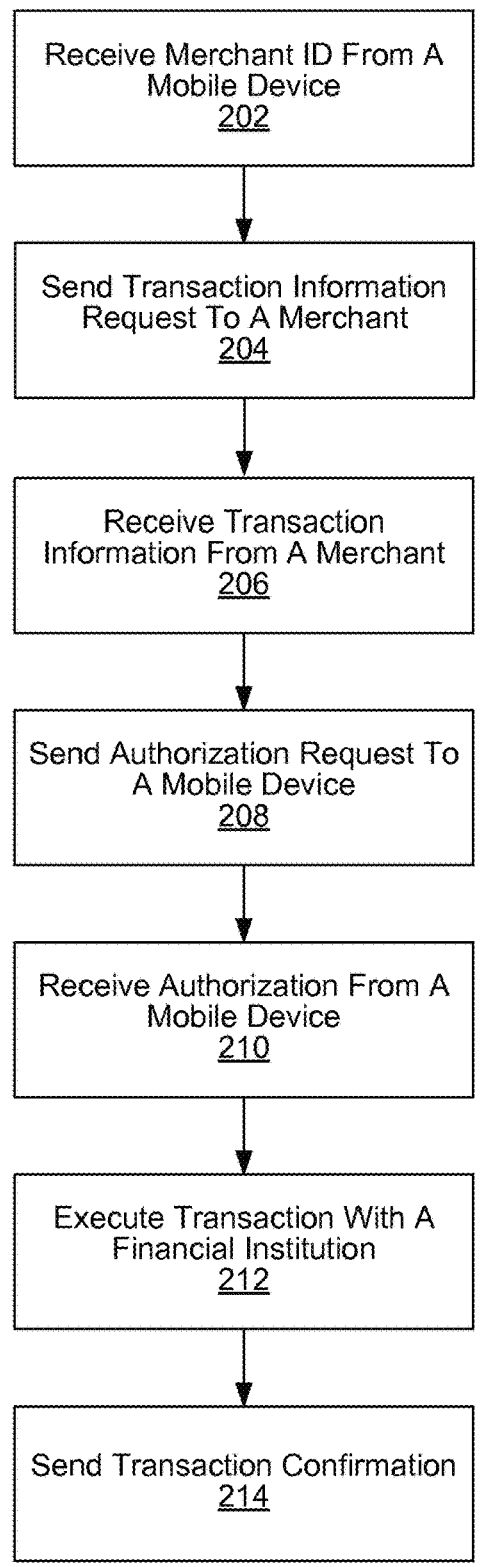
FIG. 2 is a flowchart illustrating a method of using a mobile device to initiate a transaction according to one embodiment.

FIG. 2 is a flowchart illustrating a method of using a mobile device to initiate a transaction according to one embodiment. For the purposes of discussion below, FIGS. 1 and 2 are discussed concurrently.

In one embodiment, the mobile device 102 initiates a point of sale transaction. A mobile device 102 can include any computing device having a processor and capability to communicate with others over a network or a communications link. Examples of a mobile device 102 include a cellular phone, personal device assistant (PDA), smart phone, laptop computer, desktop computer or other devices. The mobile device sends a merchant ID associated with a merchant to the payment processing server 106. The merchant ID number is a unique identifier associated with a merchant. The merchant ID can include any information to identify or communicate with the associated number. For example, a merchant ID can include a point-of-sale terminal ID to be used by the merchant to execute the transaction. In other embodiments, the merchant ID can include an e-mail address or a phone number associated with the merchant.

In one embodiment, the customer can enter the merchant ID on to the mobile device 102 using the mobile device's input system, such as a keyboard or a touchpad etc. In other embodiments, the merchant ID information can be received by a camera on the mobile device 102. In other embodiments, the merchant ID information can be displayed in plain view for customer to use. In other embodiments, the merchant ID information can be displayed in alphanumeric or bar code format for customer to use. In other embodiments, the merchant ID information can be received by the mobile device 102 through a communications link such as BLUETOOTH communications or RFID communications fields. For example, a merchant can have a point-of-sale terminal which broadcasts the merchant ID to mobile devices via a BLUETOOTH, laser, radio, infrared or close range electromagnetic field communications link. In one embodiment, the mobile device 102 sends the received merchant ID to another party over a communications network.

The mobile device 102 can use any available communications (COMM) method to send the merchant ID to the mobile enablement center 106. It can use unstructured supplementary service data (USSD), short message service (SMS), multi-media message service (MMS), IVR, email, short message peer-to-peer (SMPP), Internet browser, an application executing on a mobile device, widget executing on a computing device, hard button (key), soft button (key) or any communication method available in the art in various wired or wireless technologies such as but not limited to code division multiple access (CDMA), wideband code divisional multiple access (WCDMA), integrated digital enhanced network (iDEN), Global System for Mobile Communications (GSM), one or more generations of wireless telephone technology, such as 2G, 3G, 4G, or any future generations of wireless telephone technology, Bluetooth, WiFi, worldwide interoperability for microwave access (WiMAX), Radio (short wave or other), infrared or any other communication method or protocol known in the art. Such a communication or other examples of communication are referred to herein, among other names, as COMM.

The mobile device 102 can use any available communications method (COMM) to send the merchant ID to the mobile enablement center 106. In one embodiment, the mobile device 102 can send the merchant ID in an SMS message over a mobile communications network, such as GSM, iDEN or CDMA networks in any setup that could be 2G, 3G, 4G or any future evolution of wireless technology. In other instances, the mobile device can send multi-media messages (MMS). For example, the customer can take a picture of a barcode or a number identifier associated with the merchant ID and send the picture over a communications network. In another instance an application executing on the mobile device 102 can interpret or recognize the barcode or number identifier associated with the merchant ID to send over a communications network. In other embodiments, the communications network used by the mobile device 102 depends on the network capabilities of the mobile device 102. For example, the mobile device can connect to a WiFi Network and send the merchant ID via email to the payment processing server 106 over the network. In one embodiment, the customer can enter the merchant ID via IVR from a landline telephone. In other embodiments, the customer can use a user interface associated with an application executing on the mobile device 102 to send the merchant ID to the mobile enablement center 106 over a communications network. The network used to connect the mobile device 102, the merchant 104, the mobile enablement center 106, the payment processing server 110, the service data point 112 and the financial institution 116 is described in greater detail below.

In one embodiment, the merchant ID is sent to an appropriate payment processing server 110. For example, a customer can provide a pre-set preference, wherein all transactions executed with the mobile device 102 are associated with a particular financial institution and routed through a particular payment processing server 110. In an embodiment IPV6 protocols can be used to route the communications request to an appropriate payment processing server 110. In another embodiment, the mobile device 102 sends the merchant ID to a mobile enablement center 106 over a communications network to be routed to an appropriate payment processing server 110.

The mobile enablement center 106 is a platform that routes outgoing messages from the mobile devices 102 to the appropriate payment processing server 110. The mobile enablement center 106 can receive routing requests from several service broadcast operators, such as mobile phone network operators, including GSM or CDMA network operators, landline phone operators, LAN operators, etc. For example, when mobile devices 102, including landline or VOIP phones send an outgoing message, the service broadcast operator associated with the device or the phone number receives the outgoing message request. The service broadcast operator routes the outgoing message to the broadcast operator associated with the intended recipient of the message. In an embodiment of the invention, the mobile enablement center 106 receives a routing request from the service broadcast operator associated with the mobile device 102 or directly from the mobile device 102. In one embodiment, the mobile enablement center 106 routes the message to an appropriate payment processing server 106 based on the outgoing message's phone number, the intended recipient's phone number, the merchant ID included in the message or any other data associated with the phone number. For example, if a user's phone number is associated with a particular financial institution 116, the mobile enablement center 106 routes the message to a payment processing server 110 associated with the financial institution 116.

In one embodiment, the payment processing server 110 interrogates a registry of payment processing servers 108 to identify an appropriate payment processing server 110. For example a registry of payment processing servers 108 can include a listing of payment processing servers 110 based on the routing numbers or other identification information associated with each financial institution or based on coordinated new routing mechanism that may be mandated, devised or supervised by, for example, a standardization body, governmental body or consortium body of companies or leaders in the field.

A payment processing server 110 is a platform that executes a transaction between a customer, a financial institution 116 associated with the customer and a merchant 104. Examples of a payment processing servers 110 include databases maintained by Visa, MasterCard, American Express, etc. In one embodiment, the payment processing server 110 receives 202 the merchant ID from the mobile device 102. In another embodiment, the payment processing server 110 receives 202 the merchant ID in a message routed by the mobile enablement center 106.

In one embodiment, the payment processing server 110 sends 204 a request for transaction information to the merchant 104 associated with the received merchant ID. Any communications method (COMM) known in the art can be used to communicate with the merchant 104. For example, the payment processing center can send an SMS message, an e-mail message etc to a phone number or an email address associated with the merchant 104. In one embodiment, the merchant ID can be associated with a merchant's unique point-of-sale terminal. In such an instance, the payment processing server 110 can send a communication to the point the particular point-of-sale terminal.

The merchant 104 can provide transaction information to send to the payment processing server 110. Transaction information can include the total purchase price for the items the customer wants to purchase, an account number associated with the merchant, the mobile phone number provided by the customer etc. The merchant 104 can use any communications method (COMM) known in art to provide the transaction information to the payment processing server 110. In one embodiment, the merchant can enter the total purchase amount on a point-of-sale terminal's keypad. A point of sale terminal can include a station wherein the merchant can swipe or key-in a customer's credit card or debit card to execute a purchase transaction. In another embodiment, the point of sale terminal can include a computing device, such as a machine to machine (M2M) device, mobile phone, a laptop or desktop computer, a tablet etc. In other embodiments, point of sale terminals can include established transaction terminals, such as an ATM or vending machine etc. In an instance where existing transaction terminals such as ATM or card-swipe terminals are used, the terminals can be updated via a firmware update to enable them to receive transaction information requests from a payment processing server 110.

The payment processing server 110 receives 206 transaction information from the merchant 104. In one embodiment, transaction information includes a phone number associated with the customer mobile device 102. The payment processing server 110 authenticates the phone number associated with the mobile device 102. In one embodiment, the payment processing server 110 authenticates the incoming message's phone number against the service broadcast operator network. For example, if a mobile phone number is associated with the T-MOBILE, the payment processing server 110 can query the T-MOBILE operator network 311 to identify the an account associated with the mobile phone number.

In another embodiment, the payment processing server 110 queries a register of data points 414, described in greater detail below. Responsive to the query, the payment processing server 110 receives the account information associated with the phone number of the mobile device 102 or the identity of the mobile enablement center 106 associated with the mobile device's 102 phone number. In one embodiment, the payment processing server 110 queries the mobile enablement center 106. Responsive to receiving the query, the mobile enablement center 106 queries a register of payment processing server 108 to retrieve the account information associated with the mobile device's 102 phone number. Once the payment processing server 110 receives the appropriate account information, the payment processing server 110 communicates with the mobile enablement center 106 associated with the mobile device's 102 phone number and sends a transaction authorization request to the mobile device 102. In one embodiment, the payment processing server 110 sends a transaction authorization to the merchant 102. As described in greater detail below, upon receiving a positive transaction authorization from mobile device 102 or the merchant 104, the payment processing server 110 initiates a transaction with an financial institution 116 associated with the account number.

As described above, the payment processing server 110 can identify an account associated with the mobile phone number 102. In one instance, more than one account may be identified as associated with the mobile phone number. In such an embodiment, the payment processing server 110 queries a mobile enablement center 106. The mobile enablement center 106 identifies an account associated with more than one account such as virtual accounts or real accounts that are identified as associated with the mobile phone number. In such an instance, additional logic can be used by the mobile enablement center 106 to identify an account from a list of possible accounts associated with the mobile phone number. For example, a user can provide that a debit account should be used for purchases under a certain dollar amount, such as $5. In another embodiment, the customer can associate the use of particular accounts when executing a transaction with a particular merchant. Thus, the payment processing server 110 can identify a debit account, if the merchant ID is associated with a retail merchant.

In one embodiment, the payment processing server 110 authenticates the merchant responsive to receiving the transaction information from the merchant. For example, the merchant can be authenticated if the merchant confirms the merchant ID or the customer mobile phone number initiating the transaction. In one instance, the payment processing server 110 identifies an account associated with the merchant once the authentication process is completed.

In one embodiment, the payment processing server 110 sends 208 an authorization request to the mobile device 102 that initiated the transaction request. For example, the payment processing server 110 sends a COMM, an SMS message or an email to the customer phone number or the email address initiating the transaction. In one embodiment, the payment processing server 110 can send 208 an account name and number to the mobile device 102 along with the authorization request. In another embodiment, the customer can provide a phone number associated with a customer account and a different communications phone number. For example, the customer initiating a transaction can provide an account phone number by initiating a communication from a different phone number. In such an instance, the customer can use an application executing on the communications mobile device 102 to initiate the transaction or use COMM messaging. In such an instance, the payment processing server 110 sends 208 an authorization request to the communications phone number, wherein the customer can provide an authorization associated with the account phone number. This could apply to a customer borrowing someone else's mobile device to perform his or her own transaction.

In one embodiment, the payment processing server 110 receives 210 an authorization from a mobile device 102. The authorization message can include a personal identification number (PIN) associated the customer's account. A customer can set multiple PINs for one or more accounts. For example, the customer can set a PIN for purchases under a preset dollar amount and a different PIN for purchases over a dollar amount. Similarly, the customer can set a separate PIN for particular merchants. In another embodiment, the customer can have a distinct PIN (or a one time use PIN which expires on first use) when the communications phone number initiating the transaction is different from the phone number associated with the customer. In one embodiment, the mobile device 102 associated with the communications phone number is configured to delete all instances of the PIN from the mobile devices' on-board or off-board memory. In such instances, the payment processing server 110 receives 210 the authorization PIN from the customer through a communications network. In another embodiment, a one-time password (one time use PIN which expires on first use) can be used by a customer using a communications phone number different than the account phone number. For example, a customer can preset a one-time password (that expires on first use) for instances when the communications phone number is different than the account phone number, for purchases over a certain dollar value or for purchases with a particular merchant.

In one embodiment, the payment processing server 110 executes 212 a transaction with a financial institution. For example, the payment processing server 110 identifies a financial institution associated with the customer's account and a financial institution associated with the merchant's account, wherein the execution of the transaction comprises of debiting the purchase amount from the customer's account and crediting the purchase amount to the merchant account. In one embodiment, additional fees applied by financial institutions 116, payment processing servers 110, mobile enablement centers 106 can be applied to the purchase amount.

Figure 3:
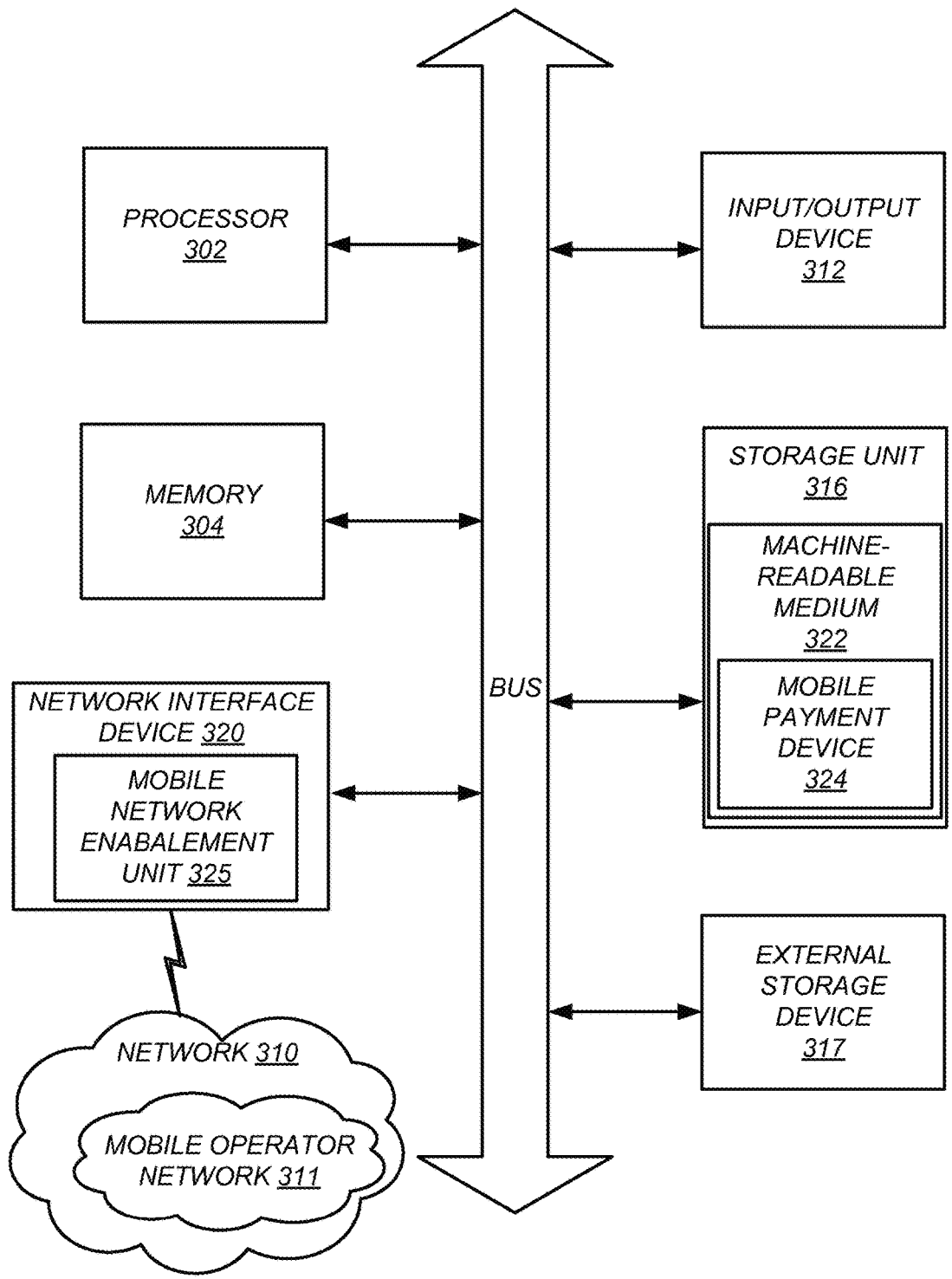
FIG. 3 is a high-level block diagram illustrating a detailed view of a payment processing server for initiating a transaction using a mobile device according to one embodiment.

In one embodiment, the payment processing server 110 sends 214 a transaction confirmation to the mobile device 102 and the merchant 104. Any communications method (COMM), such as an SMS message, an email address, a phone call or described below in reference to FIG. 3 can be used to send 214 the confirmations. In one embodiment, the payment processing server 110 sends the confirmation to a point-of-sale terminal associated with the merchant ID. In such an instance, the point-of-sale terminal can print a copy of the confirmation for the merchant's or the customer's records. In an instance wherein the communications phone number is different than a phone number associated with the transaction account, the payment processing server 110 sends 214 a transaction confirmation to one or both phone numbers. The confirmation communication can include details about whether the transaction was successfully completed, the date and time of the confirmation, the total transaction amount etc. In another instance the payment processing server 110 sends 214 the transaction confirmation via COMM to the merchant's mobile device if one was identified by merchant as preferred delivery mechanism for confirmations FIG. 3 is a high-level block diagram illustrating a functional view of a typical computer system 300 for use as one of the entities illustrated in the computing environment of FIG. 1 according to one embodiment. It is noted that the computing machine 300 may also be a system or part of a system, e.g., two or more machines operating together or one or more machines operating with one or more other devices.

FIG. 3 illustrates components of a machine able to read instructions from a machine-readable medium and execute them in one or more processors and/or controllers. Specifically, FIG. 3 shows a diagrammatic representation of a machine within which mobile payment device instructions 324 (e.g., software code) can be executed to perform anyone or more of the methodologies discussed herein. In alterative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 324 (sequential or otherwise) that specify actions to be taken by that machine. Further, while only a single machine is illustrated, the term "machine" shall also be taken to include any collection of machines that individually or jointly execute instructions 324 to perform anyone or more of the methodologies discussed herein.

The example computer machine 300 includes a processor 302 (e.g., a central processing unit (CPU), or group of processors, or a group of processing machines, a graphics processing unit (GPU), a digital signal processor (DSP), one or more application specific integrated circuits (ASICs), one or more radio-frequency integrated circuits (RFICs), or any combination of these), a memory 304, including a main memory and a static memory, a network interface device 320 capable of interacting with a network 310, an input/output device 312 (e.g., a keyboard, a cursor control device, a plasma display panel (PDP), a liquid crystal display (LCD), a projector, or a cathode ray tube (CRT)) and a storage unit 316 configured to communicate with each other via a bus.

The storage unit 316 includes a machine-readable medium 322 on which is stored mobile payment device instructions 324 (e.g., software) embodying any one or more of the methodologies or functions described herein. The mobile payment instructions 224 (e.g., software) may also reside, completely or at least partially, within the main memory 304 or within the processor 302 (e.g., within a processor's cache memory) during execution thereof by the computer system 300, the main memory 304 and the processor 302 also constituting machine-readable media.

The external storage 317 includes a machine-readable medium on which mobile device or merchant information can be stored. In one embodiment, the machine 300 can access the external storage 317 via a communications links, as described above. In an embodiment, all components of the machine 300 can access the storage medium 317.

While machine-readable medium 322 is shown in an example embodiment to be a single medium, the term "machine-readable medium" should be taken to include a single medium or multiple media (e.g., a centralized or distributed database, or associated caches and servers) able to store instructions (e.g., mobile payment device instructions 324). The term "machine-readable medium" shall also be taken to include any medium that is capable of storing instructions (e.g., mobile payment device instructions 324) for execution by the machine and that cause the machine to perform any one or more of the methodologies disclosed herein. The term "machine-readable medium" includes, but not be limited to, data repositories in the form of solid-state memories, optical media, and magnetic media.

The mobile payment device instructions 324 (e.g., software) may be transmitted or received over the network 310 via the network interface device 320. In one embodiment, the network 310 is the Internet. The network 310 can also utilize dedicated or private communications links that are not necessarily part of the Internet. In one embodiment, the network 114 uses standard communications technologies and/or protocols. Thus, the network 114 can include links using technologies such as Ethernet, Wi-Fi (802.11), integrated services digital network (ISDN), digital subscriber line (DSL), asynchronous transfer mode (ATM), etc. Similarly, the networking protocols used on the network 114 can include multiprotocol label switching (MPLS), the transmission control protocol/Internet protocol (TCP/IP), the hypertext transport protocol (HTTP), the simple mail transfer protocol (SMTP), the file transfer protocol (FTP), etc. In one embodiment, at least some of the links use mobile networking technologies, including general packet radio service (GPRS), enhanced data GSM environment (EDGE), code division multiple access 2000 (CDMA2000), and/or wideband CDMA (WCDMA). The data exchanged over the network 114 can be represented using technologies and/or formats including the hypertext markup language (HTML), the extensible markup language (XML), the wireless access protocol (WAP), the short message service (SMS) etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

The example computer machine 300 includes a mobile network enablement unit 325 which includes the logic software (SLEE—Service Logic Execution Environment) and hardware for connecting to connect, control and communicate with any mobile network operator's node, any messaging node (such as a short message service center (SMSC), a multimedia message service center (MMSC), mail transport/transfer agent (MTA), wireless access protocol (WAP), database (DB), (session description protocol) SDP, service control point (SCP), mobile switching center (MSC), central office (CO) for wired communications, service switching point (SSP), authentication, authorization and access/accounting (AAA), gateway GPRS (general packet radio service) support node (GGSN), combined GPRS node (CGSN), packet data servicing node (PDSN), or any other node that may exists in the operator network regardless of the technology used (CDMA, WCDMA, iDEN, GSM, 2G, 3G, 4G, or future revisions of the wireless communications system, Bluetooth, WiFi, WiMax, Radio (short wave or other), infrared or any other communication method or protocol known in the art). Mobile network enablement unit 325 supports all communication protocols and standards including but not limited to instant messaging service (IMS), signaling system 7 (SS7), internet protocol (IP), transport/transmission control protocol (TCP), transaction capabilities application part (TCAP), intelligent network application protocol (INAP), mobile application part/multiple access protocol (MAP), CS1, CS2, CS3, CS4, common alerting protocol version 1 (CAP v1), CAPv2, CAPv3, CAPv4, all wireless intelligent network (WIN) standards, all intelligent network (IN) standards and all advanced intelligent network (AIN) standards, etc. In one embodiment, the mobile network enablement unit 325 communicates with a mobile operator network 311. As described in greater detail above, the mobile operator network 311 includes CDMA, WCDMA, iDEN, GSM, 2G, 3G, 4G, or future revisions of the wireless communications system.

Figure 4:
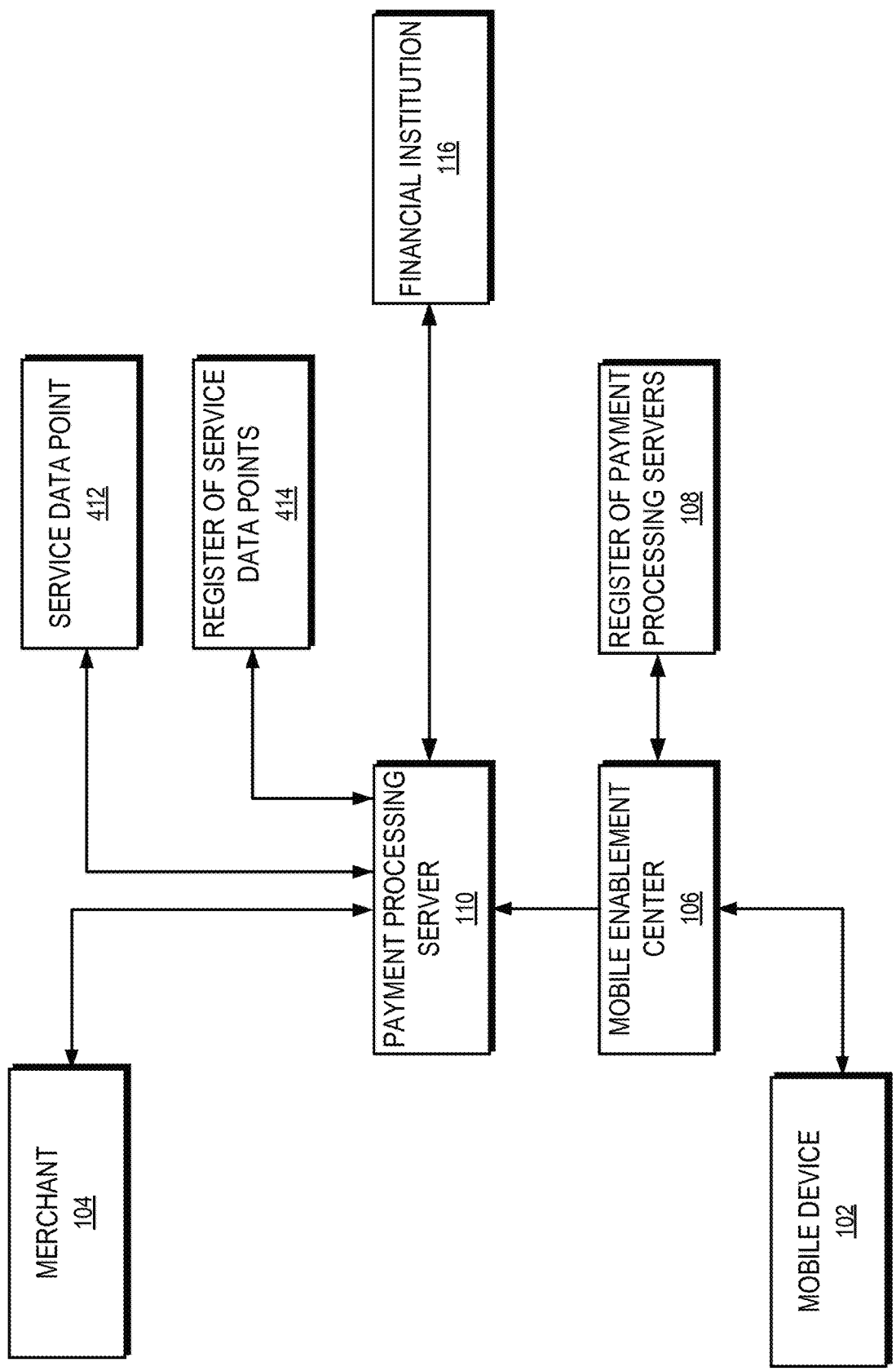
FIG. 4 is a high-level block diagram that illustrates a computing environment for using a mobile device to initiate a transaction according to one embodiment.

Referring now to FIG. 4, it illustrates a high-level block diagram of a computing environment for using a mobile device to initiate a transaction according to one embodiment. The computing environment may include a mobile device 102, a mobile enablement center 106, a register of payment processing servers 108, a payment processing server 110, a merchant 104, a service data point 412, a register of service data points 414 and a financial institution 116.

Figure 5:
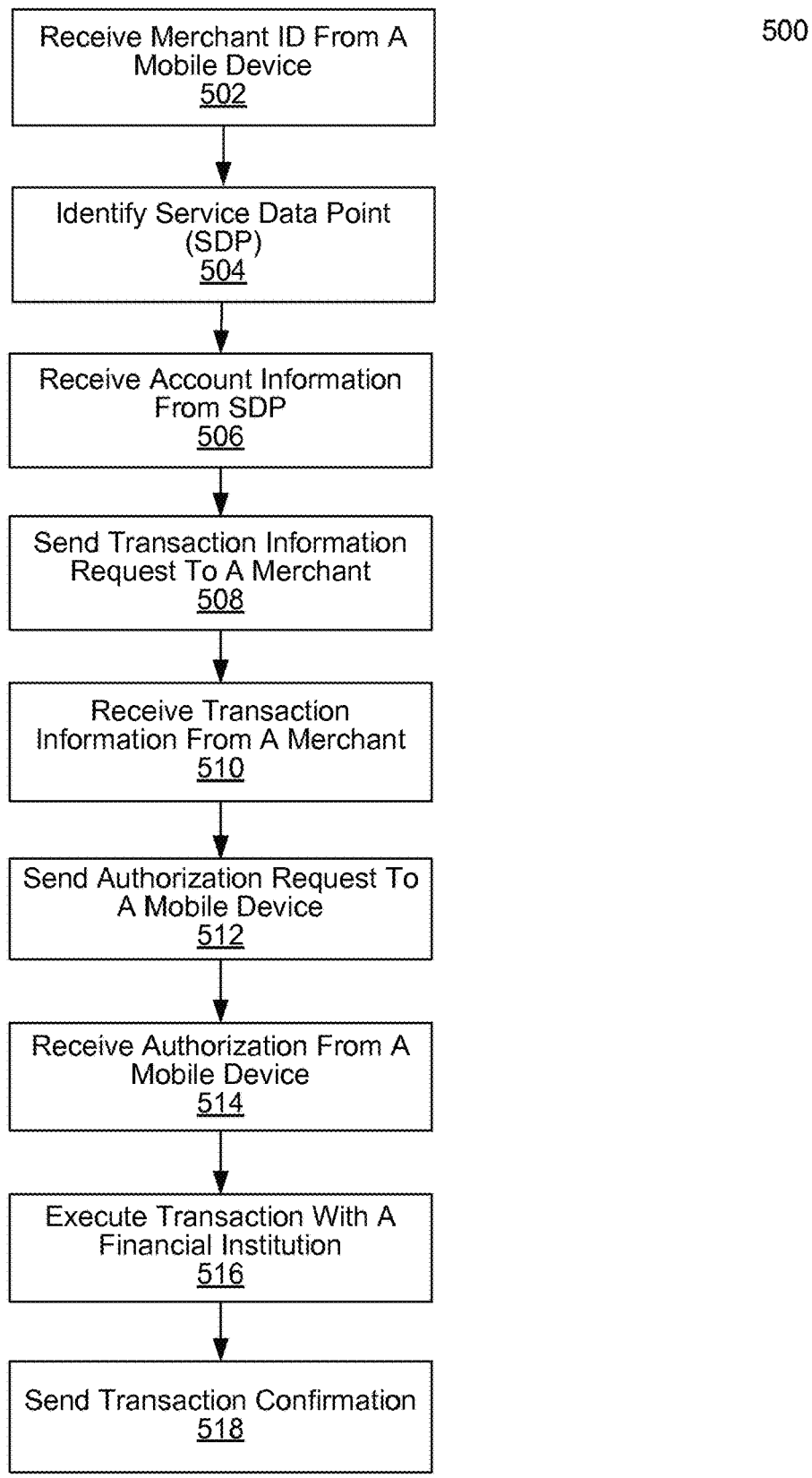
FIG. 5 is a flowchart illustrating a method of using a mobile device to execute a transaction according to one embodiment.

FIG. 5 is a flowchart illustrating a method of using a mobile device to initiate a transaction using a service data point according to one embodiment. For the purposes of discussion, FIGS. 4 and 5 are discussed concurrently below.

As described in greater detail above, the mobile device 102 initiates a transaction request by sending a merchant ID to the mobile enablement center 106 or the payment processing server 110. The payment processing server 110 receives 502 the merchant ID and sends 504 a transaction information request to the merchant associated with the merchant ID. As described above, any communications method (COMM) known in the art can be used to communicate with the merchant 104. For example, the payment processing center can send an SMS message, an e-mail message etc to a phone number or an email address associated with the merchant 104. In one embodiment, the merchant ID can be associated with a merchant's unique point-of-sale terminal. In such an instance, the payment processing server 110 can send a communication to the point the particular point-of-sale terminal. The payment processing server 110 can also use the commonly known ISO8583 interface to communicate with the point of sale terminal.

Service data point (also referred to as SDP) is a computing machine with, for example, all the components described above in 300, that telecommunication operators normally use to store service logic and subscriber account balances, subscriptions, services, expiration of service dates, etc. SDPs have multiple names in different operator and vendor environments, for the purpose of this disclosure SDP refers to any and all of those nodes equivalent in function as described herein.

In one embodiment, the SDP can be used for banking, financial, investment and/or insurance operations such as keeping track of account balances, debiting accounts, crediting accounts and transferring of account funds from one account to another. A centralized SDP or SDP Register can be used to provide routing information to signals destined to a certain SDP. In an embodiment, an SDP register can be under the control, jurisdiction (auspices) of a governmental or consortium body that would regulate its functions and management.

In one embodiment the SDP communicates with financial institutions 116, ATM machines, point of sale terminals, a mobile enablement center 106 and/or a merchant 104 for the purpose of processing point of sale transactions with financial institutions or payment processing servers 110. For example SDP will support any standard data communication protocol and data security standards such as, but not limited to, International Standards Organization (ISO) 8583, simple object access protocol (SOAP)/extensible markup language (XML), SOAP, hypertext transfer protocol (HTTP), secure sockets layer (SSL), etc.

In one embodiment, the payment processing server 110 identifies 504 a service data point (SDP) responsive to a phone number provided by the mobile device 102. The phone number is a customer phone number associated with the customer's banking account that is controlled by SDP. A service data point 412 is a database where customer phone numbers are stored in addition to customer account information, and where the customer's account information can be retrieved based on its associated with the provided phone number. In one embodiment, the service data point 412 can be used to control financial institution accounts.

In one embodiment, the payment processing server cannot identify an appropriate SDP based on the provided account phone number. In such an instance, the payment processing system sends an interrogation request to the registry of SDPs 414 to identify 504 an SDP associated with the customer's account phone number. The registry of SDPs 414 provides the routing information to an SDP 412 associated with the customer's banking account.

Once an appropriate SDP 412 is identified, the payment processing server interrogates the SDP to receive 506 account information associated with the customer's phone number. The SDP 412 can retrieve account information associated with the customer's phone number.

As described above, the payment processing server 110 sends 508 a transaction information request to the merchant indentified by the merchant ID. Responsive to the request, the merchant can send transaction information to the payment processing server. In one embodiment, the payment processing server receives 510 the transaction information from the merchant via communications means known in the arts. As described above, the transaction information can include the total purchase price for the items the customer wants to purchase, an account number associated with the merchant, the mobile phone number provided by the customer etc. The merchant 104 can use any communications method (COMM) known in art to provide the transaction information to the payment processing server 110. In one embodiment, the merchant can enter the total purchase amount on a point-of-sale terminal's keypad.

As described above, in one embodiment, the payment processing server 110 sends 512 an authorization request to the mobile device 102 that initiated the transaction request. For example, the payment processing server 110 sends a COMM, an SMS message or an email to the customer phone number or the email address initiating the transaction. In one embodiment, the payment processing server 110 can send 512 an account name and number to the mobile device 102 along with the authorization request. In another embodiment, the customer can provide a phone number associated with a customer account and a different communications phone number. For example, the customer initiating a transaction can provide an account phone number by initiating a communication from a different phone number. In such an instance, the customer can use an application executing on the communications mobile device 102 to initiate the transaction, or do it using COMM messaging. In such an instance, the payment processing server 110 sends 512 an authorization request to the communications phone number, wherein the customer can provide an authorization associated with the account phone number.

In one embodiment, the payment processing server 110 receives 514 an authorization message from a mobile device 102. The authorization message can include a personal identification number (PIN) associated the customer's account. A customer can set multiple PINs for one or more accounts. For example, the customer can set a PIN for purchases under a preset dollar amount and a different PIN for purchases over a dollar amount. Similarly, the customer can set a separate PIN for particular merchants. In another embodiment, the customer can have a distinct PIN (or a one time use PIN which expires on first use) when the communications phone number initiating the transaction is different from the phone number associated with the customer. In one embodiment, the mobile device 102 associated with the communications phone number is configured to delete all instances of the PIN from the mobile devices' on-board or off-board memory. In such instances, the payment processing server 110 receives 514 the authorization PIN from the customer through a communications network. In another embodiment, a one-time password (or a one time use PIN which expires on first use) can be used by a customer using a communications phone number different than the account phone number. For example, a customer can preset a one-time password (that expires on first use) for instances when the communications phone number is different than the account phone number, for purchases over a certain dollar value or for purchases with a particular merchant.

Once a correct authorization code e.g., a PIN is received from the mobile device 102, the payment processing server executes the requested transaction with the SDP 412. The SDP 412 updates the account information associated with the customer. The payment processing server 110 sends a transaction confirmation to the mobile device 102 and the merchant 104. As described above, in one embodiment, the payment processing server 110 sends 518 a transaction confirmation to the mobile device 102 and the merchant 104. Any communications method (COMM), such as an SMS message, an email address, a phone call or described above can be used to send 518 the confirmations. In one embodiment, the payment processing server 110 sends 518 the confirmation to a point-of-sale terminal associated with the merchant ID. In such an instance, the point-of-sale terminal can print a copy of the confirmation for the merchant's or the customer's records. In an instance wherein the communications phone number is different than a phone number associated with the transaction account, the payment processing server 110 sends 518 a transaction confirmation to one or both phone numbers. The confirmation communication can include details about whether the transaction was successfully completed, the date and time of the confirmation, the total transaction amount etc.

Figure 6:
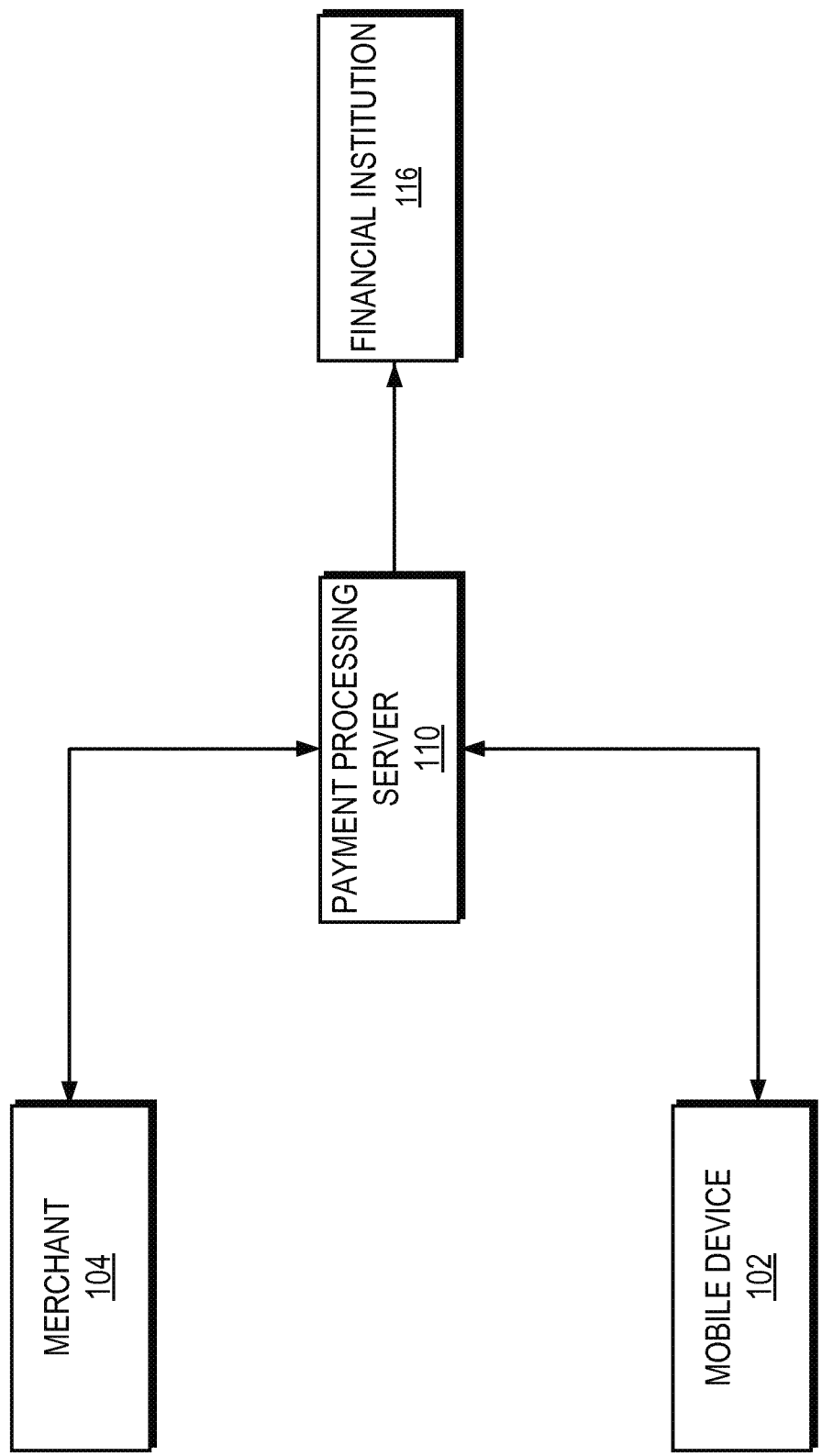
FIG. 6 is a high-level block diagram that illustrates a computing environment for using a mobile device to execute a transaction according to one embodiment.

FIG. 6, illustrates a high-level block diagram of a computing environment for using a mobile device to execute a transaction according to one embodiment. The computing environment may include a mobile device 102, a payment processing server 110, a merchant 104 and a financial institution 116.

Figure 7:
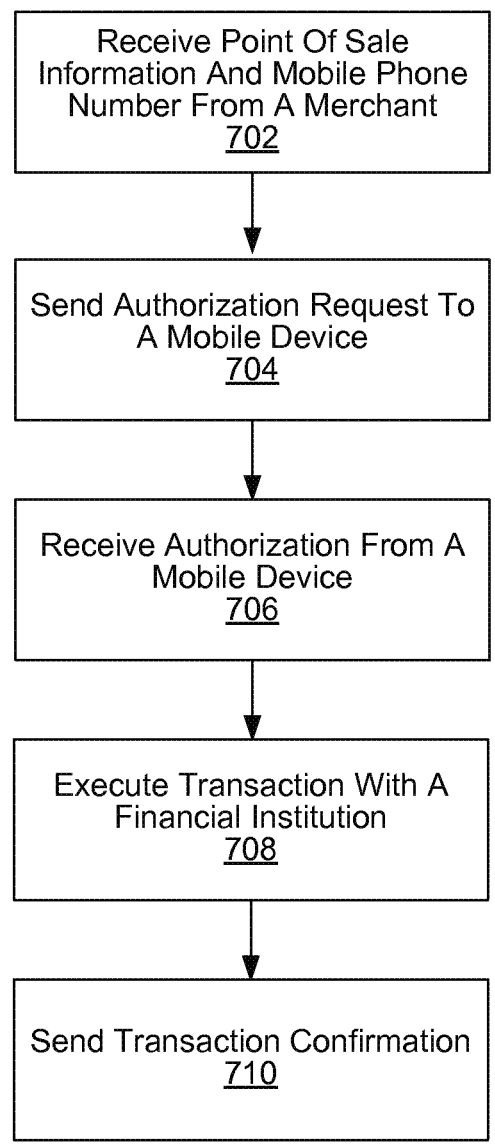
FIG. 7 is a flowchart illustrating a method of using a mobile device to execute a transaction according to one embodiment.

FIG. 7 is a flowchart illustrating a method of using a mobile device to initiate a transaction using a service data point according to one embodiment. For the purposes of discussion, FIGS. 6 and 7 are discussed concurrently below.

In one embodiment of the system and method described below, the point of sale is initiated by the merchant. In one embodiment, a point of sale terminal associated with the merchant 104 is used to enter and send point of sale information such as a transaction amount, a communications phone number and an account phone number. An account phone number is a phone number associated with a financial institution. For example, the customer can preset that a particular phone number is associated with a particular account with a financial institution. The account can be a credit account, a debit account, a savings account, a payroll account, etc. A communications phone number can be the phone number associated with the customer. In another instance, the communications phone number is different from an account phone number, allowing a customer to use a borrowed phone to execute a transaction. For example, if a customer realizes that he or she lost or forgot his or her mobile phone, the customer can borrow someone else's phone by requesting that a communication be sent to the phone number associated with the borrowed phone. In other embodiments, the customer can provide a communications email address or an account email address wherein, the email account is associated with a financial institution's account for the customer.

In one embodiment, the payment processing server 110 receives 702 the point of sale information from the merchant 104. The payment processing server 110 sends 704 an authorization request to the communications phone number provided by the merchant 104. As described above, in one embodiment, the payment processing server 110 sends 704 an authorization request to the communications phone number or the account phone number as provided by the customer. In one embodiment, the payment processing server 110 sends a COMM, an SMS message or an email to the phone number or the email address initiating the transaction. In one embodiment, the payment processing server 110 can send 704 an account name and number to the mobile device 102 along with the authorization request. For example, if the customer has associated several credit or debit accounts with an account phone number, the payment processing server 110 can provide a listing of all the accounts available to the customer. In such an instance the payment processing server 110 opens a data session to the mobile device 102 and provides a menu to choose from wherein the customer can choose the account to execute the transaction with. In another embodiment, the payment processing server 110 uses a USSD menu option if available in the network or a WAP push message with several links denoting various accounts, or communicate to a client on the mobile device 102. Also, in such an instance, the customer can enter an authorization PIN for an account the customer wishes to use to execute the purchase. In another embodiment, the payment processing system requests one PIN even if the customer has associated several accounts with the account phone number. In such an instance, the customer can enter the authorization PIN for the account the customer wants to use to execute the purchase. The payment processing server 110 can identify a credit or a debit account based on whether the authorization PIN matches one of accounts associated with the account phone number.

In one embodiment, the customer can enter and send a message to the payment processing server 110 to authorize the transaction. The payment processing server 110 receives 706 the authorization from a mobile device 102. The authorization message can include a personal identification number (PIN) associated with the customer's account. A customer can set multiple PINs for one or more accounts. For example, the customer can set a PIN for purchases under a preset dollar amount and a different PIN for purchases over a dollar amount. Similarly, the customer can set a separate PIN for particular merchants. In another embodiment, a one-time password (or a one time use PIN which expires on first use) or PIN can be used by a customer when using a communications phone number different than the account phone number. For example, a customer can preset a one-time password (that expires on first use) for instances when the communications phone number is different than the account phone number, for purchases over a certain dollar value or for purchases with a particular merchant. In one embodiment, the mobile device 102 associated with the communications phone number is configured to delete all instances of the PIN from the mobile devices' on-board or off-board memory. In such instances, the payment processing server 110 receives 706 the authorization PIN from the customer through a communications network.

Responsive to the customer sending the authorization, the payment processing server 110 receives 706 the authorization from the mobile device 102. As described in greater detail above, the payment processing server executes 708 the point of sale transaction with financial institutions associated with the customer and the merchant 104. Once the transaction is executed 708, the payment processing server sends a confirmation to the merchant 104, the communication and the account phone number associated with the customer. As described above, in one embodiment, the payment processing server 110 sends 710 a transaction confirmation to the mobile device 102 and the merchant 104. Any communications method (COMM), such as an SMS message, an email address, a phone call or described above can be used to send 710 the confirmations. In one embodiment, the payment processing server 110 sends 710 the confirmation to a point-of-sale terminal associated with the merchant ID. In such an instance, the point-of-sale terminal can print a copy of the confirmation for the merchant's or the customer's records. In an instance wherein the communications phone number is different than a phone number associated with the transaction account, the payment processing server 110 sends 710 a transaction confirmation to one or both phone numbers. The confirmation communication can include details about whether the transaction was successfully completed, the date and time of the confirmation, the total transaction amount etc.

Figure 8:
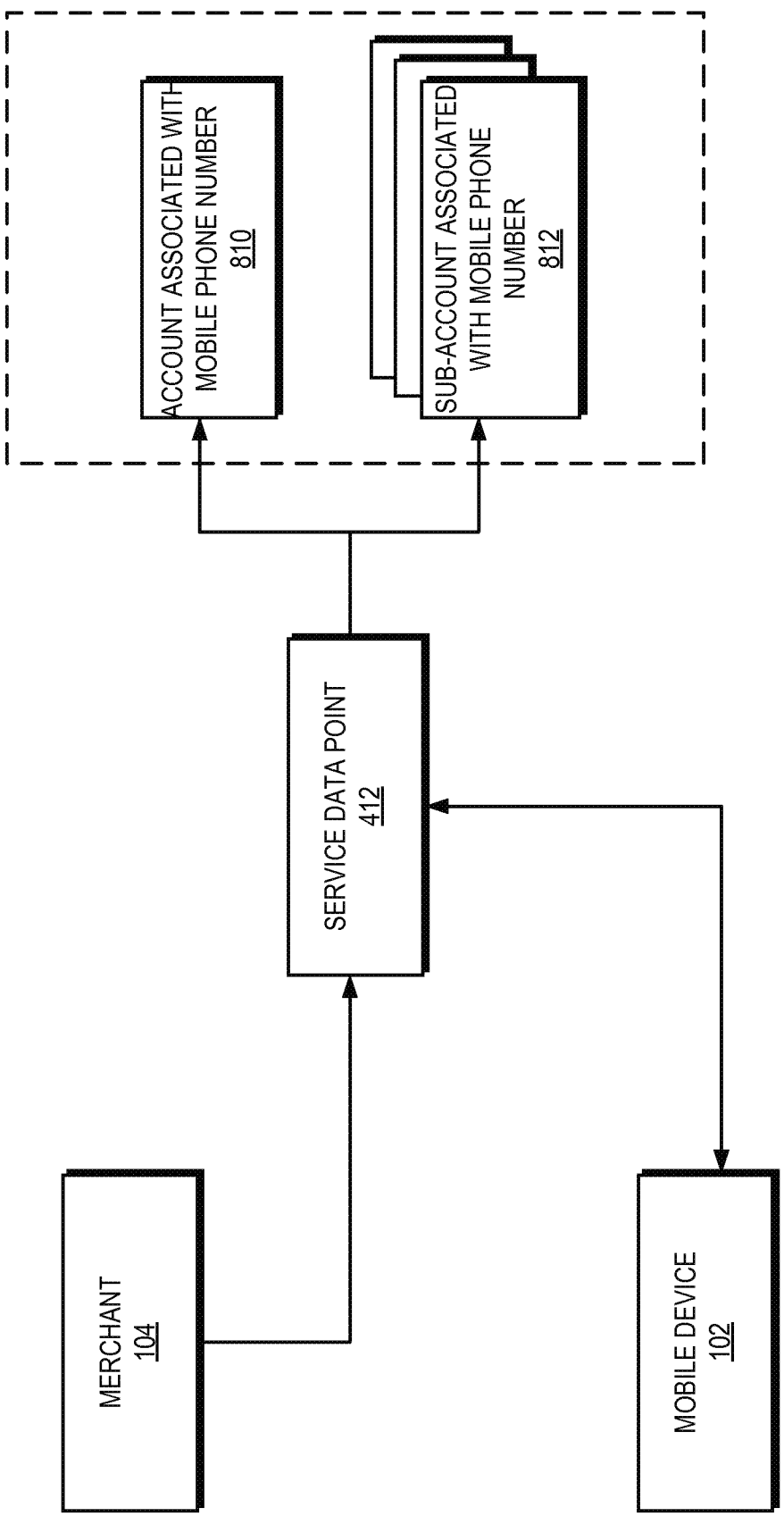
FIG. 8 is a high-level block diagram that illustrates a computing environment for using a mobile device to execute a transaction associated with a sub-account according to one embodiment.

Referring now to FIG. 8, it illustrates a high-level block diagram of a computing environment for using a mobile device to execute a transaction associated with a sub-account according to one embodiment. The computing environment may include a mobile device 102, an SDP 412, an account associated with the mobile phone number 810 and a sub-account associated with the mobile phone number 812.

Figure 9:
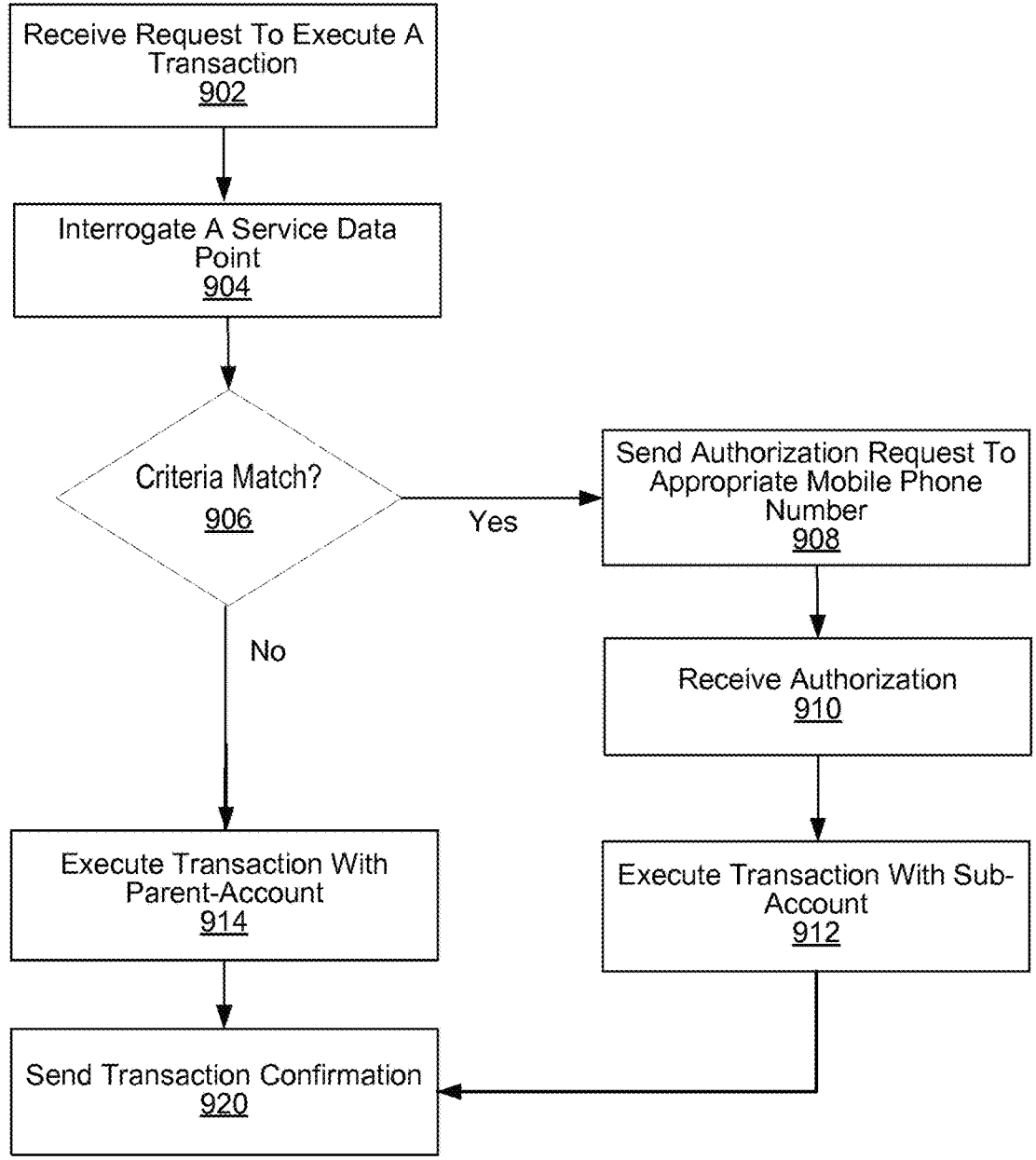
FIG. 9 is a flowchart illustrating a method of using a mobile device to execute a transaction associated with a sub-account according to one embodiment.

FIG. 9 is a flowchart illustrating a method of using a mobile device to execute a transaction associated with a sub-account according to one embodiment. For the purposes of discussion, FIGS. 8 and 9 are discussed concurrently below.

As described in greater detail above, the mobile device 102 or the merchant 104 can initiate a transaction request by sending a merchant ID and an account phone number to a service data point (SDP) 412. In one embodiment, the SDP receives 902 the transaction request either from the merchant 104 or from the mobile device 102. In one embodiment, the SDP is interrogated 904 to determine if the received account phone number is associated with a sub-account. A sub-account 812 is associated with a parent account 810 wherein the sub-account may have limited access to the funds available to the parent account 810 or the account associated with the mobile phone number. If the SDP determines that the account phone number is associated with a sub-account, the SDP provides that a sub-account criteria is matched 906.

In other embodiments, the sub-account criteria can be matched 906 in other ways. For example, a phone number can be associated with a sub-account. In such an instance, if a communications phone number matches the sub-account 812 criteria, the SDP executes 912 a transaction with the sub-account responsive to receiving the appropriate authorization. In other embodiments, an authorization PIN can be associated with a sub-account. If the sub-account criteria are met, the SDP sends an authorization request to one or more of the communications phone number, a phone number associated with the sub-account or a phone number associated with the parent account 810. For example, the SDP or the payment processing server 110 can send 908 an authorization request to the account phone number associated with the parent account 810 or the phone number associated with the sub-account, or both. As such, a customer can create a sub-account for a family member, such that the customer's children or other family members can make certain purchases using their own mobile device. Similarly, in an embodiment wherein the authorization request is sent to a phone number associated with the parent account 810, the parent can provide real-time approval or rejection of certain purchases initiated by the sub-account holder.

As described above, in one embodiment, the payment processing server 110 sends 908 an authorization request to an appropriate mobile device 102 including the mobile device 102 that initiated the transaction request or to a phone number associated with the parent account 810. For example, the payment processing server 110 sends an SMS message or an email the phone numbers or the email address provided. In one embodiment, the payment processing server 110 can send 908 an account name and number to the appropriate mobile device 102 along with the authorization request. In another embodiment, the customer can provide a phone number associated with a customer account and a different communications phone number. For example, the customer initiating a transaction can provide an account phone number by initiating a communication from a different phone number. In such an instance, the customer can use an application executing on the communications mobile device 102 to initiate the transaction or use COMM messaging. In such an instance, the payment processing server 110 sends 908 an authorization request to the communications phone number, wherein the customer can provide an authorization associated with the account phone number.

The SDP can receive 910 the authorization from the sub-account phone number, the communications phone number or the phone number associated with the parent account 810. The authorization message can include a personal identification number (PIN) associated the customer's account. A customer can set multiple PINs for one or more accounts. For example, the customer can set a PIN for purchases under a preset dollar amount and a different PIN for purchases over a dollar amount. Similarly, the customer can set a separate PIN for particular merchants. In another embodiment, the customer can have a distinct PIN (or a one time use PIN which expires on first use) when the communications phone number initiating the transaction is different from the phone number associated with the customer. In one embodiment, the mobile device 102 associated with the communications phone number is configured to delete all instances of the PIN from the mobile devices' on-board or off-board memory. In such instances, the payment processing server 110 receives 910 the authorization PIN from the customer through a communications network. In another embodiment, a one-time password (or a one time use PIN which expires on first use) can be used by a customer using a communications phone number different than the account phone number. For example, a customer can preset a one-time password (that expires on first use) for instances when the communications phone number is different than the account phone number, for purchases over a certain dollar value or for purchases with a particular merchant.

The SDP can initiate an execution of the transaction between the customer and the merchant 104. If the SDP does not receive an appropriate authorization or a sub-account criteria match, the SDP executes 914 the transaction with the parent-account 810. As described in greater detail above, a transaction confirmation is sent to the merchant, the communications phone number, the account phone number or the sub-account phone number.

Figure 10:
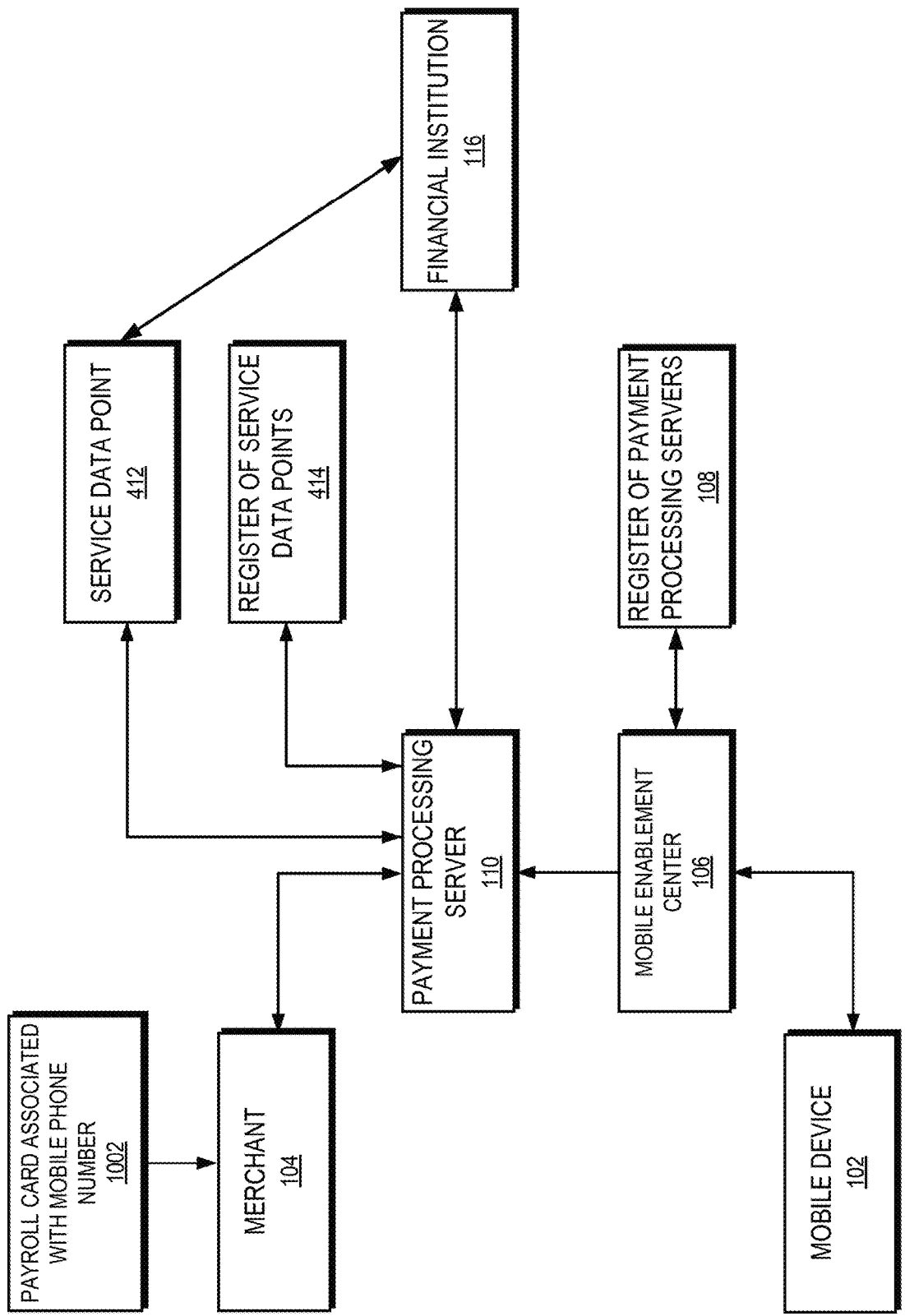
FIG. 10 is a high-level block diagram that illustrates a computing environment for using a payroll card to execute a transaction according to one embodiment.

FIG. 10 is a high-level block diagram that illustrates a computing environment for using a payroll card to execute a transaction according to one embodiment. The computing environment may include a mobile device 102, a mobile enablement center 106, a register of payment processing servers 108, a payment processing server 110, a merchant 104, a service data point 112, a register of service data points 114 and a financial institution 116.

In one embodiment the SDP could control an aggregate account (also referred to as a Nostro Account) in a bank that includes multiple sub accounts that can represent payroll accounts. Such payroll accounts could be used for those that cannot establish an account on their own because of lack of sufficient funds or lack of good credit. Such aggregate accounts could be accessed by any payment processing server 110 or SDP if they are associated with a mobile phone number. One such subaccount in an aggregate account can have multiple virtual accounts. For example a worker with no bank account would ask employer to use such subaccount for direct deposit of payroll. The subaccount would be associated with the workers mobile phone number. The worker would be able to create multiple virtual sub-subaccounts on the SDP and move funds to those sub-subaccounts. Each sub-subaccount would be associated with a mobile phone and could be accessed by phone with the aid of any payment processing server 110 or mobile enablement center 106. In one embodiment the SDP can take the place or perform the functions of the mobile enablement center. In one embodiment the SDP can control fund transfer between banks, phone account numbers and between merchants.

Figure 11:
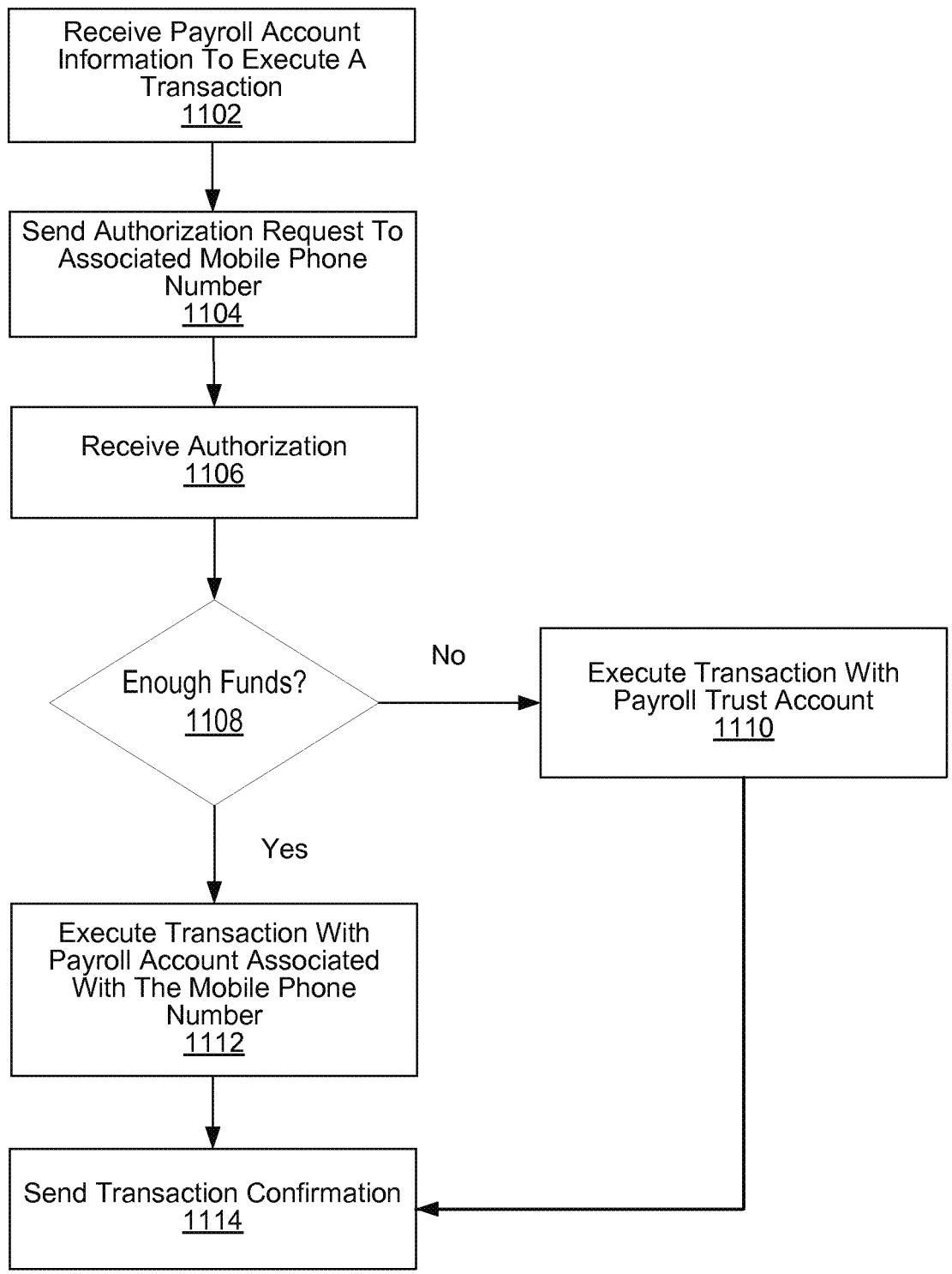
FIG. 11 is a flowchart illustrating a method of using a payroll card to execute a transaction according to one embodiment.

FIG. 11 is a flowchart illustrating a method of using a payroll card to execute a transaction according to one embodiment. For the purposes of discussion, FIGS. 10 and 11 are discussed concurrently below.

In the embodiment discussed in reference to FIGS. 10 and 11, the point of sale transaction is initiated by a merchant 104 or a mobile device 102, wherein the account phone number is associated with a payroll card 1002. A payroll card 1002 can be a debit card associated with a payroll account. An employer of the customer using the payroll card can deposit payroll checks in the payroll account. For example, instead of giving the customer a weekly, bi-weekly or monthly payroll check which can be either cashed or deposited, the employer can make weekly, bi-weekly or monthly payroll deposits to the payroll account, such that the employer would not have to issue new payroll checks each payroll cycle. Such a system is beneficial because it reduces the employer's cost of issuing checks. Additionally such a system is beneficial to employees because they have access to an account associated with a card which can be used to make purchases without opening additional accounts or a new line of credit with another financial institution. Additionally, each payroll account can be associated with a payroll trust account. A payroll trust account is an aggregate of accounts used by the employer to make deposits to each individual payroll account associated with an employee. The payroll trust account generally carries a float and cannot be closed. As described in greater detail below, an additional benefit of the system and method described herein is to allow customers to borrow funds from the trust account if the funds in the their customer payroll accounts are depleted. The payroll trust account can withhold money due to the employee in the next payroll period. The withheld money can be a portion of the borrowed money, the entirety of the borrowed money or the entirety of the borrowed money in addition to fees and interests.

In one embodiment, the payment processing server receives 1102 a request to execute a transaction from an account associated with the payroll card 1002. For example, a merchant can swipe or enter the account number associated with the payroll card on a point of sale terminal. In such an instance, the point of sale terminal can receive a firmware update to enable a customer to use a payroll account card to execute a purchase. In another embodiment, a mobile device can be used to initiate a point of sale transaction. As described above, the mobile device can send an account phone number and a merchant identification to a service data point (SDP) 412 or to a mobile enablement center 106. In another embodiment, as described above, the customer can borrow a mobile computing device to initiate a point of sale transaction.

Upon receiving the request, the SDP sends 1104 and receives 1106 appropriate authorization information to a mobile phone number associated with the payroll account or communications phone number. As described above, in one embodiment, the SDP 412 sends 1104 an authorization request to the mobile device 102 associated with the payroll account. For example, the SDP 412 sends an COMM, SMS message or an email to the customer phone number or the email address associated with the payroll account. In one embodiment, the SDP 412 can send 1104 an account name and number to the mobile device 102 along with the authorization request. In another embodiment, the payment processing server can send 1104 authorization request to communications phone number different from the account phone number associated with the payroll account. For example, a communications phone number can be provided in the communication received 1102 providing payroll account information to execute a transaction. In such an instance, the customer can use an application executing on a mobile device 102 associated with the communications phone number to initiate the transaction.

In one embodiment, the SDP 412 receives 1106 an authorization from a mobile device 102. The authorization message can include a personal identification number (PIN) associated the customer's account. A customer can set multiple PINs for one or more accounts. For example, the customer can set a PIN for purchases under a preset dollar amount and a different PIN for purchases over a dollar amount. Similarly, the customer can set a separate PIN for particular merchants. In another embodiment, the customer can have a distinct PIN (or a one time use PIN which expires on first use) when the communications phone number initiating the transaction is different from the phone number associated with the customer. In one embodiment, the mobile device 102 associated with the communications phone number is configured to delete all instances of the PIN from the mobile devices' on-board or off-board memory. In such instances, the SDP 412 receives 1106 the authorization PIN from the customer through a communications network. In another embodiment, a one-time password (or a one time use PIN which expires on first use) can be used by a customer using a communications phone number different than the account phone number. For example, a customer can preset a one-time password (that expires on first use) for instances when the communications phone number is different than the account phone number, for purchases over a certain dollar value or for purchases with a particular merchant.

An SDP logic identifies whether the payroll account has enough funds 1108 to execute the requested transaction. If so, the SDP executes 1112 the transaction with a bank associated with the payroll card. If the SDP determines that the payroll account does not have sufficient funds, the SDP executes 1110 a transaction with the payroll trust account. Once the transaction is complete, a transaction confirmation is send to the merchant and the mobile device associated with the payroll account. In one embodiment, the SDP 412 sends 1114 a transaction confirmation to the mobile device 102 and the merchant 104. Any communications method (COMM), such as an SMS message, an email address, a phone call or described above can be used to send 1114 the confirmations. In one embodiment, the SDP 412 sends 1114 the confirmation to a point-of-sale terminal associated with the merchant ID. In such an instance, the point-of-sale terminal can print a copy of the confirmation for the merchant's or the customer's records. In an instance wherein the communications phone number is different than a phone number associated with the transaction account, the SDP 412 sends 1114 a transaction confirmation to one or both phone numbers. The confirmation communication can include details about whether the transaction was successfully completed, the date and time of the confirmation, the total transaction amount etc.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A method performed by a payment processing server for conducting a transaction between a terminal and a customer, comprising:
    receiving, at the payment processing server, a terminal identifier from the mobile device operated by the customer, the terminal identifier indicating a request to initiate a transaction with a terminal identified by the terminal identifier, wherein the terminal identifier does not indicate a transaction amount for the transaction;
    sending, at the payment processing server, in response to receiving the terminal identifier, a transaction information request to the terminal associated with the terminal identifier;
    receiving, at the payment processing server, transaction information from the terminal in response to the transaction information request, the transaction information including the transaction amount for the transaction;
    receiving, at the payment processing server from the mobile device, a customer phone number associated with the payment transaction;
    identifying, at the payment processing server, a service data point associated with the customer phone number;
    requesting, by the payment processing server, a customer account associated with the customer phone number from the service data point;
    receiving, at the payment processing server, the customer account from the service data point;
    identifying a terminal account associated with the terminal; and
    initiating, at the payment processing server, the transaction between the customer account and the terminal account for the transaction amount received from the terminal.

2. The method of claim 1, wherein the customer phone number differs from a phone number associated with the mobile device.

3. The method of claim 1, wherein initiating the transaction comprises instructing the service data point to perform the transaction.

4. The method of claim 1, further comprising:
    receiving a personal identification number (PIN) for the customer account; and
    verifying the PIN with the service data point.

5. The method of claim 4, wherein the PIN is a one-time use PIN.

6. The method of claim 5, wherein the PIN is a one-time use PIN based on the amount of the transaction, mobile device, or terminal account.

7. The method of claim 4, wherein the PIN is based on whether the mobile device is associated with the customer phone number.

8. The method of claim 1, wherein the customer account is a subaccount of an account associated with the customer phone number.

9. The method of claim 8, wherein the subaccount is based on a personal identification number (PIN).

10. The method of claim 1, further comprising:
    sending an authorization request to a mobile device associated with the customer phone number;
    receiving an approval from the mobile device associated with the customer phone number; and
    wherein the transaction is initiated responsive to receiving the approval.

11. A non-transitory computer-readable medium containing instructions for performance by one or more processors of a payment processing server for conducting a transaction between a terminal and a customer, the instructions being executable for:
    receiving, at the payment processing server, a terminal identifier from the mobile device operated by the customer, the terminal identifier indicating a request to initiate a transaction with a terminal identified by the terminal identifier, wherein the terminal identifier does not indicate a transaction amount for the transaction;
    sending, at the payment processing server, in response to receiving the terminal identifier, a transaction information request to the terminal associated with the terminal identifier;
    receiving, at the payment processing server, transaction information from the terminal in response to the transaction information request, the transaction information including the transaction amount for the transaction;
    receiving, at the payment processing server from the mobile device, a customer phone number associated with the payment transaction;
    identifying, at the payment processing server, a service data point associated with the customer phone number;
    requesting, by the payment processing server, a customer account associated with the customer phone number from the service data point;
    receiving, at the payment processing server, the customer account from the service data point;
    identifying a terminal account associated with the terminal; and initiating, at the payment processing server, the transaction between the customer account and the terminal account for the transaction amount received from the terminal.

12. The non-transitory computer-readable medium of claim 11, wherein the customer phone number differs from a phone number associated with the mobile device.

13. The non-transitory computer-readable medium of claim 11, wherein initiating the transaction comprises instructing the service data point to perform the transaction.

14. The non-transitory computer-readable medium of claim 11, the instructions further executable for:
receiving a personal identification number (PIN) for the customer account; and
verifying the PIN with the service data point.

15. The non-transitory computer-readable medium of claim 14, wherein the PIN is a one-time use PIN.

16. The non-transitory computer-readable medium of claim 15, wherein the PIN is a one-time use PIN based on the amount of the transaction, mobile device, or terminal account.

17. The non-transitory computer-readable medium of claim 14, wherein the PIN is based on whether the mobile device is associated with the customer phone number.

18. The non-transitory computer-readable medium of claim 11, wherein the customer account is a subaccount of an account associated with the customer phone number.

19. The non-transitory computer-readable medium of claim 18, wherein the subaccount is based on a personal identification number (PIN).

20. The non-transitory computer-readable medium of claim 11, the instructions further executable for:
sending an authorization request to a mobile device associated with the customer phone number;
receiving an approval from the mobile device associated with the customer phone number; and
wherein the transaction is initiated responsive to receiving the approval.

* * * * *